UNITED STATES PATENT OFFICE.

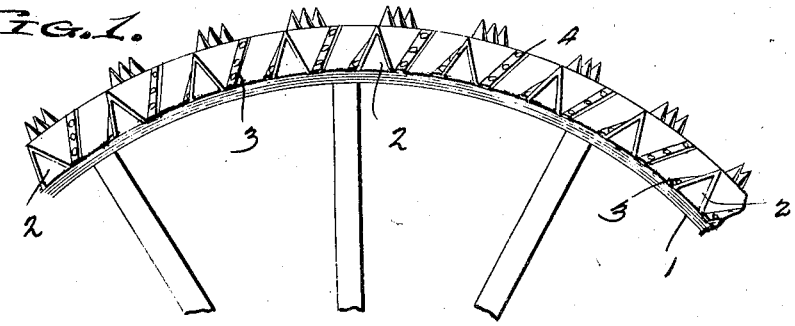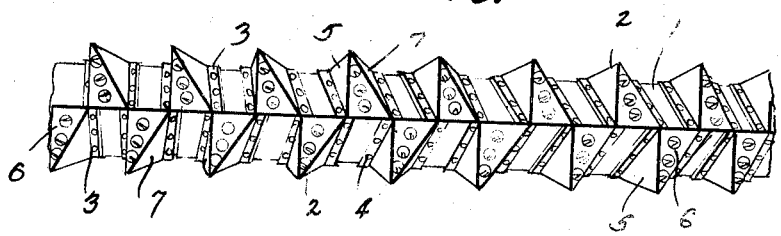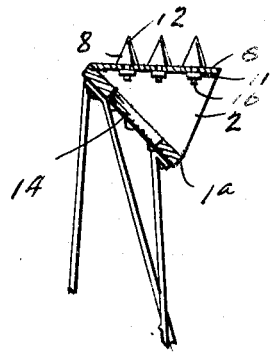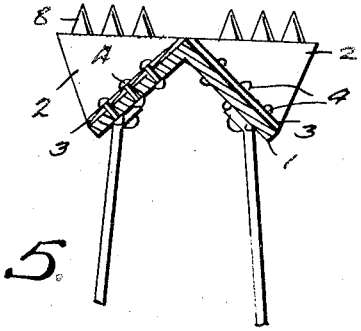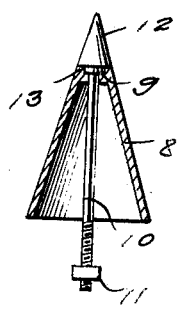

ARVID RODINE, OF DRINKWATER, SASKATCHEWAN, CANADA.

TRACTION-WHEEL.

1,331,724.

Specification of Letters Patent.   Patented Feb. 24, 1920.

Application filed February 26, 1919.  Serial No. 279,307.

*To all whom it may concern:*

Be it known that I, ARVID RODINE, a citizen of the United States, residing at Drinkwater, in the Province of Saskatchewan and Dominion of Canada, have invented certain new and useful Improvements in Traction-Wheels, of which the following is a specification.

The invention has for its object to provide a traction wheel which automatically clears itself of mud and which precludes any possible slipping on soft or sandy surfaces.

The invention provides a novel form of rim which inclines transversely so as to facilitate the shedding of mud and also to combine with the rim, lugs and spurs in a peculiar way to insure the ready discharge of mud yet prevent slipping when the wheel is under a load.

The drawing illustrates a preferred embodiment of the invention. However, it is to be understood that in adapting the same to meet different conditions, various changes in the form, proportion, and minor details of construction may be resorted to without departing from the nature of the invention as claimed hereinafter.

In the drawing hereto attached,

Figure 1 is a side view of part of a traction wheel embodying the invention.

Fig. 2 is a top view of the part illustrated in Fig. 1.

Fig. 3 is a transverse section showing the parts on a larger scale.

Fig. 4 is a view similar to Fig. 3 of a modification.

Fig. 5 is a detail view of one of the spurs partly in section.

Corresponding and like parts are referred to in the following description and indicated in the several views of the drawing by like reference characters.

The main portion of the wheel may be of any construction but the rim is of such formation as to incline transversely, the purpose being to facilitate the shedding or automatic discharge of mud or other matter tending to adhere to the tread of the wheel. In the form illustrated in Figs. 1, 2 and 3 the rim 1 is substantially of V form, hence the tread surfaces are oppositely inclined from a medial line. In the modification shown in Fig. 4 the rim 1ª inclines in one direction only throughout its width, hence this form of rim sheds the mud and other matter to one side of the wheel only whereas the form of rim illustrated in the relating views sheds the mud and other matter equally upon opposite sides of the wheel. It is to be understood that the rim of the wheel will be suitably supported and braced in order to withstand the lateral strain. This lateral strain is equalized upon the preferred form of rim indicated in Figs. 1, 2 and 3 but the form of rim shown in Fig. 4 requires to be braced against the lateral strain which is in one direction only and not neutralized.

Lugs 2 are provided upon the outer side of the rim and said lugs are preferably hollow and of peculiar form and may be struck up from sheet metal or cast. As shown most clearly in the several views the lugs 2 have basic flanges 3 which are adapted to receive suitable fastenings 4 such as rivets. Each of the lugs 2 is formed with three faces 5, 6 and 7. The face 6 is outermost and constitutes the tread, the face 5 faces forward and is designated as the rear face. Each of the faces is of triangular form. The outer or tread face 6 is in the plane of the outermost portion of the rim and is disposed at a right angle to a plane passing perpendicularly through the axis of the wheel so that it engages squarely with the surface over which the wheel is traveling. The front face 5 extends outwardly from the plane of the wheel at a right angle, as shown most clearly in Fig. 2 and inclines rearwardly from the edge nearer the axis of the wheel. The rear face 7 inclines rearwardly from the tread face and inwardly from its outer edge. As shown most clearly in Fig. 2 the front face 5 of each of the lugs prevents an abrupt surface best adapted to sustain the pulling force whereas the rear face 7 is inclined in two directions so as to form a brace to sustain the pulling force and also facilitate the shedding of mud and other matter which ordinarily tends to cling to the wheel. By reason of the transverse inclination of the outer side of the rim and the relative inclination of the faces of adjacent lugs the inclosed space has an outward and lateral flare which insures a discharge of mud and other matter to one side of the wheel. When the rim is constructed with oppositely inclined portions the mud and other matter is discharged equally at both sides of the wheel but when the rim inclines laterally in one direction only, as indicated in Fig. 4 the discharge is at one side of the wheel only. In the form of rim having oppositely inclined portions the lugs secured to one portion of the rim are disposed opposite the spaces between the lugs secured to the opposite portion of the rim, as indicated most clearly in Fig. 2. In other words the tractor lugs secured to opposite portions of the rim have a staggered arrangement.

In order to prevent possible slipping particularly when the wheel is designed for traveling over soft and sandy surfaces it is preferred to provide the lugs on their tread surfaces with spurs and these spurs are indicated in detail in Fig. 5. Each spur comprises a tapering body 8 which is preferably hollow. The body 8 is truncated and its outer end countersunk, as indicated at 9. A stem 10 passes through the body 8 and its inner end is threaded and receives a nut 11. The outer end of the stem is formed with a point 12 and an enlargement 13 at the base of the point 12 snugly fits countersink 9 of the body 8. The threaded end of the stem 10 passes through an opening in the tread face of the lug and receives a nut 11 upon the projecting end. In this manner the spur is secured to the tread face of the lug. In order to facilitate attachment and detachment of the spurs the rim is formed with an opening 14 through which a suitable tool or instrument may be introduced for reaching the nuts 11. This is indicated most clearly in Fig. 4. It is to be understood that each lug may be provided with any number of spurs and that the latter are disposed by preference in a central position.

The foregoing description and the drawing have reference to what may be considered the preferred, or approved form of my invention. It is to be understood that I may make such changes in construction and arrangement and combination of parts, materials, dimensions, et cetera, as may prove expedient and fall within the scope of the appended claim.

Having thus fully described my invention, what I claim as new and desire to secure by Letters Patent is:

A traction wheel having its outer or tread side transversely inclined and lugs on the tread side of the rim and having their outer or tread faces at right angles to the plane of the wheel, and their front and rear faces relatively inclined, the several faces of the lugs being of triangular form.

In testimony whereof I affix my signature in presence of two witnesses.

ARVID RODINE.

Witnesses:
H. A. ELDER,
GEORGE MILLER.